UNITED STATES PATENT OFFICE.

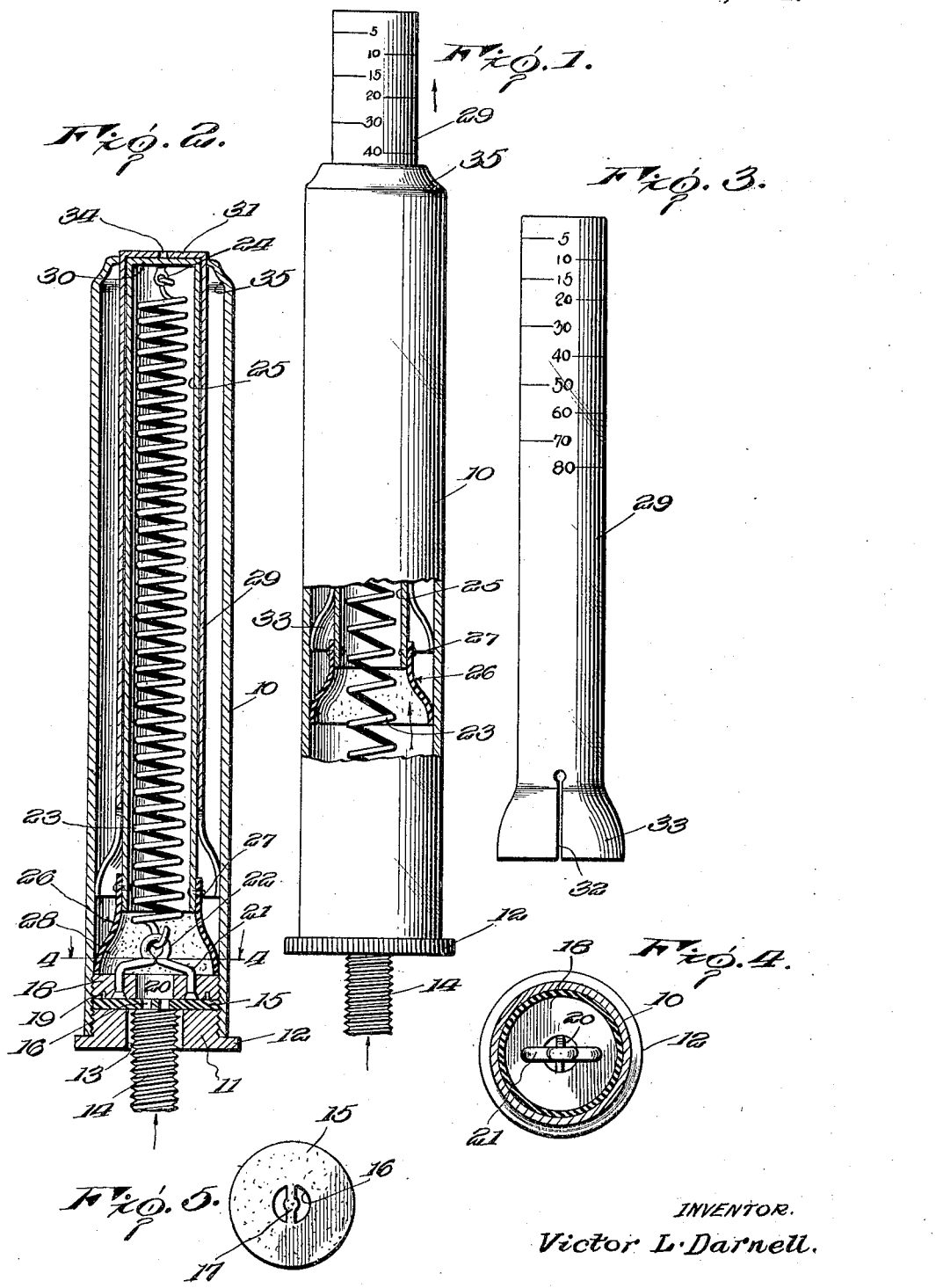

VICTOR L. DARNELL, OF BALTIMORE, MARYLAND.

GAUGE.

1,402,056.  Specification of Letters Patent.  Patented Jan. 3, 1922.

Application filed November 24, 1919. Serial No. 340,185.

*To all whom it may concern:*

Be it known that I, VICTOR L. DARNELL, a citizen of the United States, residing at Baltimore, State of Maryland, have invented certain new and useful Improvements in Gauges, of which the following is a specification.

This invention relates to improvements in gauges especially adapted for recording the pressure in vehicle tires.

An important object of this invention is to provide a tire gauge having an indicator which when elevated by the pressure of the tire will retain its position so that the gauge may be read after the removal of the same from the tire valve.

A further object of the invention is to provide a tire gauge having a novel form of operating device for the indicator which renders the use and operation of the device extremely simple and reliable.

A further object of the invention is to provide a tire gauge which is accurate, of highly simplified construction and cheap to manufacture.

In the accompanying drawing forming a part of this application and in which like numerals are employed to designate like parts throughout the same, Figure 1 is a side elevation of a tire gauge embodying the invention, parts thereof being broken away.

Figure 2 is a vertical, central, longitudinal section through the same,

Figure 3 is a side elevation of an indicator embodied in the invention,

Figure 4 is a horizontal section taken on the line 4—4 of Figure 2,

Figure 5 is a plan view of a washer embodied in the invention.

In the drawings wherein for the purpose of illustration is shown a preferred embodiment of the invention, the numeral 10 generally designates a hollow cylinrical casing which may be stamped or otherwise formed form any suitable metal. As illustrated in Figure 2, the lower portion of the cylindrical casing 10 is interiorly screw threaded and receives an annular cap screw or retaining nut 11 having an outwardly extending flange 12 by which the nut may be either applied or removed. The nut 11 is provided with a centrally arranged cylindrical opening 13 adapted to receive the nipple 14 of a pneumatic tire inflation valve. The disk washer 15 is held within the lower portion of the casing 10 by the nut 11, and is provided with a centrally arranged opening 16 for establishing communication between the nipple 14 and the interior of the casing. A bridge arm 17 traverses the opening 16 of the washer and is adapted to depress the stem of the inflation valve when the same is inserted within the opening 13 so as to allow the air from the valve to enter the interior of the casing. Obviously when the device is removed the valve stem will be automatically elevated so as to prevent leakage of air through the nipple. It will be noted that the opening 16 in the washer is of a lesser diameter than the nipple so that said washer serves to provide an air-tight connection between the gauge and the valve when the gauge is applied.

An anchoring screw 18 is threaded within the lower portion of the casing forwardly of the washer 15 and is provided with notches 19 for the reception of a suitable tool by which the screw 18 may be applied or removed. The anchoring screw 18 is provided with a centrally arranged opening 20 arranged in longitudinal alinement with the openings 13 and 16 so as to permit the air to readily enter the casing upon being discharged from the valve. The anchoring screw or nut 18 carries a U-shaped yoke 21 which has its intermediate portion looped to provide an eye 22 to which is connected the lower end of a contractile coil spring 23. The upper end of the coil spring is connected to an eye 24 carried by the upper end of a hollow cylindrical piston 25. As illustrated in Figure 2, the coil spring extends for substantially the entire length of the piston and serves to normally retain the same retracted or within the casing 10. A sleeve washer 26 receives the lower end of the piston and is secured to the same as indicated at 27 and has its lower portion flared into contact with the inner side of the casing, as indicated at 28. By this construction an air-tight connection between the sleeve washer 26 and the casing is provided and it will be noted that as the air pressure on the sleeve 26 increases the same is forced more firmly into contact with the casing. The piston 25 is slidably arranged within an indicator sleeve 29 of elongated cylindrical formation. When the piston 25 is forced upwardly by the air pressure from the tire, the top 30 of the same engages the top 31 of the indicator sleeve 29 and thereby elevates said indicator.

As illustrated in Fig. 3, the indicator sleeve 29 is provided with a plurality of transverse calibrations which serve to indicate the pounds of pressure within the tire. Obviously the figure which registers with the upper end of the casing 10 indicates the pressure exerted on the piston 25. The lower portion of the indicator sleeve 29 is flared and is provided with a pair of diametrically opposed longitudinally extending incisions or slots 32 which serve to provide spring arms 33 having frictional contact with the inner side of the casing 10, so that when the indicator is elevated the same will retain its position until manually depressed. Therefore when the piston 25 is moved outwardly by the air pressure within the tire, the indicator 29 is also elevated and is retained in this position by the frictional contact of the spring arms 33 with the casing. When the gauge is removed from the valve, the piston of course will return to its retracted position independently of the indicator 29 so that the indicator may be read after the device has been removed from engagement with the valve. A small aperture 34 may be provided in the top 31 of the indicator so that there will be no suction between the piston and the indicator upon the return of the piston. This eliminates the possibility of the sleeve being drawn rearwardly with the piston as the result of any vacuum which may be created in the upper portion of the indicator. The upper portion of the casing 10 is reduced to provide an annular shoulder 35 which co-acts with the spring arms 33 to limit the upward movement of the indicator. Therefore an excessive pressure on the piston will not force the indicator out of the upper end of the casing.

In the operation of the device, the annular nut 11 is applied to the nipple 14 so that the valve stem of the valve will be depressed by the bridge 17 for establishing communication between the interior of the tire and the piston. When the pressure enters the piston, the same is elevated which results in the elevation of the indicator 29 so that the pressure within the tire may be accurately read on the indicator. When the indicator has been positioned to record the pressure, the device is removed from the valve to a point where the indicator may be conveniently read. After the pressure has been ascertained, the indicator may of course be manually depressed to its normal position.

Having thus described the invention, what is claimed is:

1. The combination with a casing, of a sleeve slidable therein and having one end portion flared and provided with a pair of longitudinal incisions forming a pair of yieldable spring arms bearing against the side walls of said casing for retaining the sleeve in a set position, one end portion of said casing being provided with an inwardly extending annular shoulder adapted to be engaged by said spring arms for limiting the movement of the sleeve, a piston arranged within said sleeve and constructed to project the sleeve beyond the casing as the piston is moved by pressure from the tire, and means normally retracting said piston, said sleeve being provided with indicating means.

2. A tire gauge comprising a casing, a sleeve slidable therein and provided with indicating means, a piston arranged within the sleeve, spring means normally retracting the said piston, and a sleeve washer secured to one end portion of said piston and flared to bear against the inner wall of the casing whereby the air pressure within the casing will press the flared portion of the sleeve washer into air-tight engagement with the casing, the slidable sleeve having a flared yieldable end conforming to said sleeve washer and frictionally engaging the casing.

3. A tire gauge comprising a casing having one end portion interiorly screw-threaded, an annular disk threaded into said casing, a washer arranged within said casing at one side of said disk and having a bridge adapted for engaging a valve stem, a nut threaded into said casing for securing the said washer in position and having an annular flange engaging one end of said casing, a piston slidable within said casing, a yoke connected to said disk and formed with an eye, a spring connected to said eye and said piston, and an indicating sleeve receiving said piston, the piston being constructed to project the sleeve beyond the casing as the piston is moved by pressure from the tire.

In testimony whereof I affix my signature.

VICTOR L. DARNELL. [L. S.]